(12) United States Patent
Briscoe et al.

(10) Patent No.: US 10,751,896 B2
(45) Date of Patent: Aug. 25, 2020

(54) SHAVING ARTICLE WITH SURFACE MODIFICATION

(71) Applicant: The Gillette Company LLC, Boston, MA (US)

(72) Inventors: Wuge Henry Briscoe, Bristol (GB); Philip Thomas Cresswell, Bristol (GB); Alison Mary Riches, Reading (GB); Robert Barrett Yates, Reading (GB)

(73) Assignee: The Gillette Company LLC, Boston, MA (US)

( * ) Notice: Subject to any disclaimer, the term of this patent is extended or adjusted under 35 U.S.C. 154(b) by 183 days.

(21) Appl. No.: 15/878,506

(22) Filed: Jan. 24, 2018

(65) Prior Publication Data

US 2018/0236678 A1    Aug. 23, 2018

(30) Foreign Application Priority Data

Feb. 20, 2017  (EP) ..................... 17156807
Jan. 19, 2018   (EP) ..................... 18152512

(51) Int. Cl.
```
B26B 21/60    (2006.01)
B26B 21/40    (2006.01)
B26B 21/44    (2006.01)
B05D 5/08     (2006.01)
B05D 3/10     (2006.01)
B26B 21/22    (2006.01)
```
(Continued)

(52) U.S. Cl.
CPC .............. *B26B 21/60* (2013.01); *B05D 3/102* (2013.01); *B05D 5/086* (2013.01); *B26B 21/227* (2013.01); *B26B 21/4068* (2013.01); *B26B 21/443* (2013.01); *C08F 293/005* (2013.01); *C23C 22/68* (2013.01); *B05D 5/08* (2013.01); *B05D 2202/10* (2013.01); *B05D 2202/15* (2013.01); *B26B 21/4081* (2013.01); *C08F 2438/01* (2013.01); *C08J 7/16* (2013.01)

(58) Field of Classification Search
None
See application file for complete search history.

(56) References Cited

U.S. PATENT DOCUMENTS

| | | |
|---|---|---|
| 6,684,513 B1 | 2/2004 | Clipstone et al. |
| 2012/0015138 A1* | 1/2012 | Chehimi ............... C08F 2/50 428/95 |
| 2017/0050328 A1 | 2/2017 | Godlieb et al. |

FOREIGN PATENT DOCUMENTS

WO    WO2015161996    * 10/2015

OTHER PUBLICATIONS

EPO Search Report with written opinion in corresponding EPO application dated Aug. 16, 2017.

* cited by examiner

*Primary Examiner* — Nathan T Leong
(74) *Attorney, Agent, or Firm* — Kevin C. Johnson (57) ABSTRACT

A method of making a shaving article comprising a substrate comprising stainless steel; and an external polymer coating comprising polymer brushes, the method comprising the steps of: providing said substrate; providing a initiating species comprising an anchor group that is chemically reactive with surface moieties on the substrate, and a polymerization initiator group; reacting said anchor group with said surface moieties of the substrate; providing monomers reactive for polymerization with the polymerization initiator; and polymerizing the monomers with the initiator group of the initiating species.

10 Claims, 5 Drawing Sheets

(51) Int. Cl.
  *C08F 293/00*   (2006.01)
  *C23C 22/68*    (2006.01)
  *C08J 7/16*        (2006.01)

SHAVING ARTICLE WITH SURFACE MODIFICATION

FIELD OF THE INVENTION

The invention relates generally to the field of applying polymer layers to shaving articles and to shaving articles comprising polymer coatings.

BACKGROUND OF THE INVENTION

Current wet shave razors typically include a razor cartridge and a razor handle.

The razor cartridge components typically include some of the following elements: one or more razor blades having a blade edge to perform the cutting of hair, a lubricating body/strip/ring, a cap, a housing, a frame, a clip, a guard, a cartridge connecting structure, or any number of each or combination thereof.

The razor handle may comprise a button, a handle grip, a cartridge connecting structure, or any combination thereof. Typically, the handle components may be formed of some combination of elastomeric and hard plastic materials. Razor handles may also comprise metallic parts, for example, stainless steel parts.

Razor cartridge components have exterior surfaces, many of which contact a user's skin during shaving. The interaction of these contacting surfaces with skin may generally play a significant role in the performance of the razor.

The inherent surface properties of stainless steel are not always optimal for the task of shaving. For example, razor blades are a typical example of shaving articles that comprise a stainless-steel substrate for which it is already known to improve their shaving characteristics by addition of layers, such as coatings, to the exterior surface thereof. Such layers may be associated with optimizing, for example, edge strength, tip shape, wear resistance, and/or blade glide (i.e. lubricious character or low friction) etc.

External layers that reduce friction with a user's skin or hair are of particular interest, for example by increasing article lubricity. A razor blade with a low coefficient of friction exhibits reduced cutting forces for beard hairs or other types of hair fibers. A reduced cutting force can significantly improve shaving attributes (safety, closeness and comfort). The concept of cutting force can be generally understood as how readily a blade passes through a hair stem during cutting. The more readily a blade cuts a hair the less tug and irritation may generally be expected.

Known coatings for razor blades may be comprised of inorganic materials for hardness and corrosion resistance, such as diamond, amorphous diamond, diamond-like carbon (DLC) material, nitrides, carbides, oxides, and ceramics in general.

Other known razor coatings may be organic, for example comprising polymers. One such polymer is polytetrafluoroethylene (PTFE), a coating of which can provide a low coefficient of friction to the coated article.

In addition to razor blades, it is also known that other razor cartridge components (e.g., blade clips, frame, housing, guard, cap, etc.) may comprise stainless steel surfaces that contact a user's skin and play a role in the shaving performance of the razor. Blade retention clips, housings, guards or caps etc. with lower coefficients of friction can glide more comfortably across a user's skin, reducing skin pull or improving skin manipulation.

Furthermore, razor handles have multiple surfaces that are contacted by a user's skin (e.g., hands on a grip). While razor handle surfaces are normally comprised of anti-slip, rubber or elastomer type materials or coatings for better gripping, they may also comprise stainless steel surfaces, the inherent surface properties of which can also be optimized.

In terms of increased lubricity of surfaces, such as for razor blades, a variety of PTFE coating processes are suggested in the art. For example, aqueous dispersion PTFE (spraying, spin coating and dipping), organic dispersion of PTFE, and vacuum based processes such as sputtering or Chemical Vapor Deposition (CVD). Known coating techniques such as painting, droplet evaporation, spray coating, spin coating, and dip coating, rely on physical adsorption.

The application of PTFE to razor blades, or other substrates, can be complex. This may lead to manufacturing costs, and/or less than desired coating efficacy. In addition, a less than desired coating fixation may result and lead to premature loss or peeling of the coating from the substrate. The latter may reduce the useful lifetime of the blades or result in skin irritation. PTFE, is also relatively inert and a resultant low adhesion to substrates means only weak, physical interactions bind it to surfaces. Such coatings may thus be prone to layer degradation, surface wear and mechanical failure.

An example of a razor having PTFE applied by way of an aqueous solution is found in U.S. Pat. No. 6,866,894, hereby incorporated by reference. The aqueous solution is applied to the surface of blades, which are then heated to a temperature that melts the solids of the aqueous solution.

Other coating technologies are known. For example, WO 2008123957 discusses adhesion of organophosphorus compounds to a cutting edge for surface modification. The organophosphorus layer on the cutting edge is in the form of a self-assembled monolayer. Also, WO 2014197667 discusses application of liquid-infused surface materials (LISM) to surfaces of razor components. The LISM layers are said to be generally abrasion-resistant, long-lasting or non-erodible, desirably elevating shaving performance, such as glide, comfort, rinsing, and cleanliness, while also simplifying the manufacturing process. WO 2015161996 describes a hard coating for blades having particles incorporated therein having covalently pendant hydrophilic polymer chains attached thereto to provide a high wearing lubricous coating. U.S. 20120015138 describes the use of a diazonium salt bearing initiator for grafting a polymer layer onto to an under-layer.

In line with the above discussion it is generally desirable to improve or enhance shaving performance of shaving articles. As compared to the prior art, it is desirable to seek new, and preferably optimized, surface enhancing layers and/or methods of applying such layers (e.g. as coatings), while maintaining or improving shaving article performance.

SUMMARY OF THE INVENTION

The present invention provides a shaving article comprising a substrate and an outer polymer coating, the substrate comprising stainless steel; and the outer polymer coating comprising polymer brushes grafted from the substrate.

The polymer coating may be provided on some or all of the surfaces of an article, and it may be provided on all of a surface or only a portion thereof. The coating may also be continuous or non-continuous. Any article may have more than one surface, and one, more, only some, or all, of the surfaces may be coated. Preferably the polymer coating is external.

The shaving article may be a non-cutting element or a cutting element. Non-cutting elements include cartridge or handle components, such as blade clips in a wet shaver or outer or inner surfaces of a foil disposed in an electric dry shaver. Cutting elements include cutter elements in an electric dry shaver or razor blades in a wet shaver product including wet shave razors. In particular, the polymer layer is usefully applied to components that come into contact with a user's skin during typical shaving, especially those components of the shaving cartridge that come into contact with the skin area being shaved. The preferred shaving article of the invention is a cutting element, and most preferably a razor blade.

Razor blades perform the cutting function of a razor cartridge. The term "razor blade" in the present invention signifies a "substrate" comprised of stainless steel which includes a blade body and at least one flank. A "substrate" signifies the substance or material acted upon in the present invention. Desirably, a razor blade includes two flanks forming a blade edge and a blade body. The two flanks intersect at a point or tip, or what is oftentimes referred to as the ultimate tip. Each flank may have one, two or more bevels. The blade body is generally the remaining area of the razor blade beneath or rearward of the flanks or bevels. A sharpened razor edge typically has an ultimate tip with a radius typically less than 500 angstroms.

Figure 6:
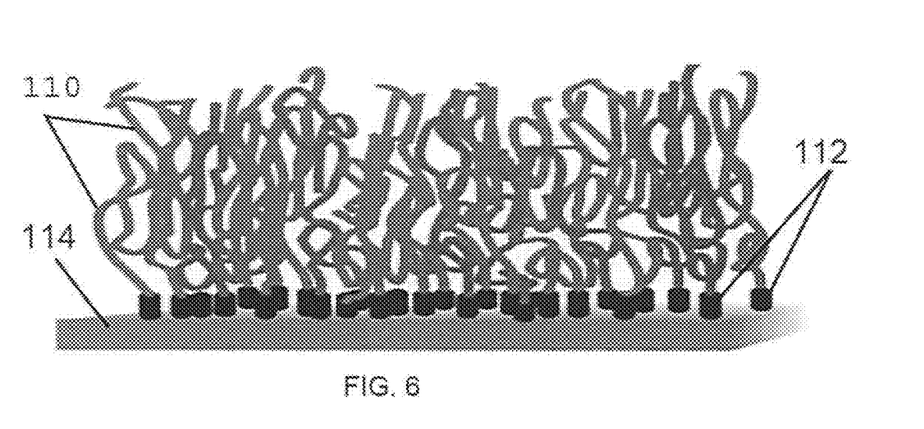
FIG. 6 is a schematic view of a substrate having polymer brushes grafted therefrom.

Polymer brushes are polymer chains that are anchored at one end to a surface (that is, terminally attached to a surface) and that extend away from the surface. The polymer brushes are polymer chains that are extend in a brush-like conformation due to repulsive interactions between neighboring chains. FIG. 6 schematically illustrates a substrate surface 114 having polymer chains 110 grafted thereon via anchors 112, and assuming a brush configuration, that is, each brush extends generally perpendicular to and away from the point of anchoring at the substrate surface. In the present application, an individual polymer chain within a multitude of polymer chains in the brush configuration, is referred to as a polymer brush.

Addition of polymer brushes chemically grafted from a substrate's surfaces have been found by the inventors to be an effective method of surface modification. Importantly, such coatings are considered to be very robust due to covalent bonding to the substrate's surface, which establishes a chemically and mechanically stable interface not relying solely on weak physical bonding, such as some alternative coating methods do.

In this manner, there can be provided a convenient route by which a substrate's characteristics may be modified by supplementation with a polymer coating. That the covalent bonding of the polymer layer provides excellent anchoring of the polymer coating to the substrate may contribute to the longevity and/or attrition resistance of the coating and the shaving article.

According to the invention there is also provided a method of applying a layer of polymer brushes to the surface of a shaving article. The method involves grafting polymer brushes from the surface to be coated.

The method may involve providing a surface to be modified with a layer of one or more initiating species having an anchor group at one end and a polymerization initiation group at an opposed end. The anchor group at one end of the initiating species is suitable for chemical reaction with surface moieties on the article surface to be modified. The polymerization initiation group is provided at an end that will extend away from the surface once the initiating species is immobilized upon the substrate surface.

The anchor group of the initiating species is reacted with the surface to be modified, covalently bonding the initiating species to the surface via the anchor group. A robust surface attachment of a layer of initiating species is thus provided on the substrate to give an initiated surface.

To graft the polymer brushes from the initiated surface, a monomer or mixture of monomers is polymerized from the initiating group of the surface-bound initiating species. The polymer brushes may thus grow away from the substrate surface, building into a layer of adjacent polymer chains or brushes.

Anchor Groups

As discussed above, the initiating species comprises an anchor group at one end and a polymerization initiation group at an opposed end. The anchor groups include moieties that are reactive with moieties on a surface of the substrate that is to be modified.

Non-limiting examples of anchor groups include acrylate groups, diazonium salts, hydroxy groups, silane groups, and phosphonic acid groups. Preferably the anchor groups are selected from acrylate groups, hydroxy groups, silane groups, and phosphonic acid groups, more preferably alkoxy silane groups and halide silane groups.

Diazonium salts have the formula $R-N^+_2X^-$, where R can be any organic group, and X is an inorganic or organic anion. A particular example of the anion $X^-$ includes tetrafluoroborate. Acrylate anchoring groups and diazonium salt anchors may be employed by way of electrografting.

Silane groups can react with metal-oxide or hydroxy groups on the substrate surface to give siloxane bonds. Examples of the silane anchor groups include alkoxylsilane groups and halide silane groups, in particular chlorosilane groups.

Exemplary halide saline groups include chlorodialkylsilane groups, dichlorosilane groups, and trichlorosilane groups. Particularly preferred examples are chlorodimethylsilane, and trichlorosilane. Particularly preferable compounds are those based on trichlorosilane Exemplary alkoxysilane groups have the formula $-Si(OR)_3$, where R is a lower alkyl group, preferably $CH_3$ or $C_2H_5$.

Phosphonic acid groups are believed to be advantageous over alkoxy- and chloro-silanes due to the former's insensitivity to nucleophilic substitution and preference to heterocondensation (Metal-O—P bond formation) over homocondensation (P—O—P). This can lead to organophosphonic acids giving more robust monolayers on the substrate surface, as compared to organosilanes which may over-condensate. Exemplary phosphonic acid groups are of the formula $-PO(OH)_2$ and $-PO(OR)_2$ where R is an alkyl or aryl group.

Hydroxy groups, silane groups, and phosphonic acid groups can be are reacted onto a substrate by immersing the substrate in an aqueous or organic solution containing the reagent with anchoring group.

Most preferably the anchor groups are selected to be reactive with surface hydroxy or oxo groups.

More than one anchoring group per initiating species molecule may be provided, for example multiples of one type of anchoring group, or combinations of anchoring groups may be used in a single initiating species molecule.

Polymerization Initiation Groups

In addition to the anchor group, the initiating species also comprises a polymerization initiation group at an opposed end.

A variety of polymerization reaction mechanisms can be used to graft polymer brushes from anchored initiating species. Examples include ring opening metathesis polymerization (ROMP); reversible addition fragmentation chain transfer polymerisation (RAFT); Nitroxide-mediated polymerization (NMP); and atom transfer radical polymerisation (ATRP). The pool of available initiation groups is thus expansive and the initiator group can be selected as appropriate for the selected polymerization reaction.

In the present invention, the preferred polymerization technique is ATRP.

Preferred polymerization initiation groups for ATRP include alkyl halides, particularly wherein the halide is selected from the group consisting of Br and Cl. The halide can act as a leaving group enabling the polymerization to proceed.

While a combination of different anchoring groups and initiating species can be used, preferred initiating species include:

2-Chloropropionate Ethyl Acrylate (cPEA)

Brominated Aryldiazonium Salt

2-bromo-N-(2-(3,4-dihydroxyphenyl)ethyl) propionamide trichloro-(4(chloromethyl)phenyl)-silane 11-(2-bromo-2-methyl)propionyloxy)undecenyldimethylchlorosilane 2-bromo-2-methyl-N-(3-(triethoxysilyl)propyl) propanamide (BTPAm)

11-(2-bromoisobutyrate)-undecyl-1-phosphonic acid

The inventors found the silane anchorable initiator species to be particularly suitable for stainless steel. Especially those with alkoxysilane groups have been found to be preferable over chlorosilane groups that may corrode stainless steel. The initiator species 2-bromo-2-methyl-N-(3-(tri-ethoxysilyl)propyl) propanamide (BTPAm) was found to be particularly compatible for functionalization of stainless steel.

The various initiating species can be bound to the substrate surface by dip-coating of the substrate in solutions comprising the initiating species. The anchoring groups of the initiating species are immobilized on the substrate surface by chemical reaction with the surface's reactive moieties, e.g. hydroxy or oxo moieties. The dip-coating solution may be aqueous or non-aqueous as appropriate to the initiating species. Suitable solvents include water, methanol, ethanol and mixtures thereof. Typically, solvent systems comprising from 75% to 95%, preferably from 80% to 90% of water and from 5% to 20%, preferably from 7% to 12% of methanol and or ethanol are preferred. Application of initiating species from emulsions, dispersions, gels, and similar may also be contemplated.

Substrates

The substrates of the present invention comprise stainless steel, and preferably comprise a stainless-steel base or core element.

The initiating species may be anchored directly to the stainless-steel surface, or may be indirectly joined to the stainless steel via an intermediate layer joined to the stainless steel. Said intermediate layer may itself comprise one or more layers. The initiating species is then anchored to the outer surface of the intermediate layer. For example, the stainless-steel base or core of the substrate may be coated with layers of inorganic materials for hardness and corrosion resistance, such as diamond, amorphous diamond, diamond-like carbon (DLC) material, nitrides, carbides, oxides, and ceramics in general, which may form part or all of an intermediate layer, upon which the polymer brush layer is provided.

The surface to which the anchor group of the initiating species is to be anchored comprises functional groups that are reactive with the anchor groups. Exemplary reactive surface groups include hydroxy groups and oxo groups. These exemplary surface moieties are capable of forming a covalent bond with the anchor group of the initiating species.

Non-limiting examples of substrates that have such groups on their surface or which form such groups by subsequent treatments such as exposure to the environment, UV, ozone or plasma treatment, include iron, steels, including stainless steel and metals which acquire an oxide coating upon exposure to the ambient environment, for example, aluminum, and aluminum alloys. Additional examples of materials that can acquire an oxide layer upon exposure to the ambient conditions are ceramic materials, for example, silicon nitride. Other materials may have an oxide coating imparted to them, for example, a hard metal oxide such as aluminum oxide applied to a substrate by sputtering.

In some embodiments of the invention, a stainless-steel base or core element may be provided with an outer layer of ceramic material, and the initiating species is anchored to the outer layer of ceramic material. The layer of ceramic material may be directly joined to the stainless steel or joined to the stainless steel via a further intermediate layer.

In a preferred embodiment, the surface to be coated is treated prior to addition of the initiating species. This pretreatment can increase the number of moieties reactive with the anchor group of the initiating species. Such pretreatments may include UV and ozone treatments. For example, substrate surfaces can be provided with, or further supplemented with (to increase area density of reactive moieties), hydroxy groups by exposing them to UV light in the presence of ozone, for example in a UVO cleaner.

Increasing the area density of reactive moieties on the substrate surface can lead to an increased surface density of initiating species on the surface, and eventually to a high density of polymer brushes. That is, a greater number of sites to which the initiator species can be bound is provided, and so a greater brush density may be achieved. High brush densities are generally desirable to achieve good surface coverage, good emergence of the polymer brush properties, good binding, and extended conformation of the polymer brush chains.

In particular, for stainless steel surfaces, UV treatment in the presence of ozone can increase the surface area density of hydroxy groups.

Stainless steel is a term that can refer to grades of steel that contain more than 10% chromium, with or without other alloying elements. Therefore, it is primarily an iron/chromium alloy but usually carbon (0.2-2.1%) and nickel are other major inclusions.

Polymerisation of Brush

Following covalent bonding of the initiating species to the surface, one or more monomers are provided and a step of polymerization of those monomers is initiated with the surface bound initiating species. In the polymerization, the monomers build into polymer chain grafted in situ from the initiating species at the surface of the article, in a living polymerization.

As discussed above, a variety of polymerization reaction mechanisms can be used, including ring opening metathesis polymerization (ROMP); reversible addition fragmentation chain transfer polymerisation (RAFT); Nitroxide-mediated polymerization (NMP); and Atom transfer radical polymerisation (ATRP). ATRP is the preferred method in the present application since it is compatible with a range of monomer types, is reasonably tolerant of impurities, involves mild reaction conditions and associated catalysts may be reusable. In the case of ATRP the polymerization initiation group on the surface tethered initiating species comprises an alkyl halide as the initiator, preferably the halide is selected to be Br or Cl. The halide forms a leaving group for the ATRP mechanism.

This method generates a dense polymer brush coverage. A dense brush coverage aids in forcing the polymer chains into their extended, i.e. brush, conformation.

The length and molecular weight of the polymer brushes can be controlled by controlling the quantity of monomer in the polymerization reaction, and the termination point of the reaction.

In the polymerization, homopolymers can be generated by providing a single monomer; copolymers can be generated by polymerizing mixtures of monomers; block copolymers can be generated by polymerizing a first monomer or first monomer mix followed by polymerization of a second monomer or monomer mix, followed by repetition to provide further blocks if desired. Gradient copolymers can be achieved by polymerizing a monomer mix and gradually adjusting the monomer mix during polymerization.

Nature of the Modification

The nature of the available modifications that may be imparted by polymer brushes to a substrate is expansive, whereby the surface can be tailored to give a range of advantageous properties over the native substrate surface.

In line with this, the polymer coating may impart any one or more of a range of differing modified characteristics to the substrate, for example, to the wear and wetting properties, and/or general functionality of the substrate. For example, the polymer may modify roughness, wetting, surface charge, surface energy, adhesion, reactivity, and friction properties of the substrate. In particular, the coating may be lubricious, hydrophilic, hydrophobic, lypophilic, lypophobic, amphiphilic, nonionic, anionic, cationic, zwitterionic or ampho-teric.

The characteristic or functionality that is provided by the polymer coating can be adjusted or fine-tuned, for example, by selection of the monomers making up the polymer brushes. For example, the polymer brushes may comprise homopolymers, copolymers, block-copolymers, and/or gradient copolymers.

Hydrophilicity of the polymeric brushes can be achieved by inclusion of nonionic or ionic hydrophilic groups, or a mixture of nonionic and ionic hydrophilic groups in the polymer brushes.

Anionic groups include carboxylic acid groups, sulphonic acid groups or phosphoric acid groups.

Cationic groups include, for example, amine groups, pyridinium groups, sulfonium groups and cationic tertiary amine groups.

Nonionic hydrophilic groups include, for example, polyoxyalkylene (meth-)acrylates, especially 2-(2'-methoxyethoxy)ethyl methacrylate ("MEO$_2$MA"), 2-(2'-methoxyethoxy)ethyl acrylate, 2-((2'-methoxyethoxy)ethoxy)ethyl methacrylate ("MEO$_3$MA").

Hydrophobicity may be incorporated by the use of lipophilic/hydrophobic groups. For example, fluorinated monomers may be used, such as pentafluorostyrene, pentafluoropropyl (meth-)acrylate, trifluoroethyl (meth-)acrylate, heptadecafluorodecyl (meth-)acrylate.

In amphiphilic copolymers, both hydrophilic and hydrophobic groups are included. When the polymer brushes are amphiphilic, they may be embodied as block polymers comprising a hydrophilic block and a hydrophobic block.

Multi-block polymer brushes are preferably di-, tri-, or tetra-block polymers; most preferably di-block polymers. The polymer blocks may be sharply defined blocks of monomers or may be gradient blocks with an overlapping transition zone between monomer blocks.

In general, examples of suitable ethylenically unsaturated monomers for use in the polymerization are (meth-)acrylic monomers. Another example of suitable monomers includes styrenic monomers, for example styrene, vinyltoluene and alpha-methylstyrene. Still further examples include acetate monomers.

Specific examples of monomers suitable for the polymer brushes include, but are not limited to, styrene, vinyl toluene, alpha-methylstyrene, vinyl acetate, vinyl esters, vinyl chloride, halogen-substituted ethylene or alkylene, methacrylonitrile, acrylonitrile, methyl (meth-)acrylate, ethyl (meth-)acrylate, propyl (meth-)acrylate, isomers of propyl (meth-)acrylate, butyl (meth-) acrylate, isomers of butyl (meth-)acrylate, hexyl (meth-)acrylate, 2-ethylbutyl (meth-)acrylate, crotyl (meth-)acrylate, 2-ethylhexyl (meth-)acrylate, isobornyl (meth-)acrylate, isoamyl (meth-) acrylate, benzyl (meth-)acrylate, phenyl (meth-)acrylate, tetrahydrofurfuryl (meth-)acrylate, 3,3,5-trimethylcyclohexyl (meth-)acrylate, alpha-methylstyrene, cyclohexyl (meth-)acrylate, stearyl (meth-)acrylate, lauryl (meth-)acrylate, isodecyl (meth-)acrylate, glycidyl (meth-)acrylate, 2-hydroxyethyl (meth-)acrylate, hydroxypropyl (meth-)acrylate, isomers of hydroxypropyl (meth-) acrylate, 4-hydroxybutyl (meth-)acrylate, isomers of hydroxybutyl(meth-)acrylate, glycerolmono(meth-)acrylate, (meth-)acrylic acid, dimethylaminoethyl (meth-)acrylate, diethylaminoethyl (meth-)acrylate, dimethylaminopropyl methacrylamide, 2-tert-butyl aminoethyl(meth-)acrylate, triethyleneglycol (meth-)acrylate, methacrylamide, N,N-dimethyl methacrylamide, N-tert-butyl methacrylamide, N-methylol methacrylamide, N-ethylol methacrylamide, alpha-methylvinyl benzoic acid (all isomers), diethylamino alpha-methylstyrene, 2-isocyanatoethyl (meth-)acrylate, isomers of diethylamino alpha-methylstyrene, trimethoxysilylpropyl (meth-)acrylate, triethoxysilylpropyl (meth-)acrylate, (meth-)acrylic acid, tributoxysilyl propyl (meth-)acrylate, dimethoxymethylsilyl propyl (meth-)acrylate, diisopropoxymethylsilylpropyl (meth-)acrylate, dimethoxysilylpropyl (meth-)acrylate, diethoxysilylpropyl (meth-)acrylate, dibutoxysilylpropyl (meth-)acrylate, diisopropoxysilyol propyl (meth-)acrylate, isobutylene, methoxy polyethyleneglycol (meth-)acrylates, poly(ethylene glycol) (meth-)acrylates, di(ethylene glycol) (meth-)acrylate, tri(ethylene glycol) (meth-)acrylate, 2-methoxyethyl (meth-)acrylate, 2-(2'-methoxyethoxy)ethyl acrylate, 2-(2'-methoxyethoxy)ethyl methacrylate ("MEO$_2$MA"), 2-(2'-methoxyethoxy)ethyl acrylate, 2-((2'-methoxyethoxy)ethoxy)ethyl methacrylate ("MEO$_3$MA") and mixtures thereof.

Friction Mediation

A particular example of surface modification can include friction mediation. Generally, for shaving articles that make contact with the area of skin and/or hair to be shaved, a lower coefficient of friction under shaving conditions is desirable. Friction reduction can minimize the cutting forces for beard hairs or other types of hair fibers leading to a lower cutting force and improved shaving attributes. Reduction of friction of other skin-contacting components, such as blade clips, can also improve shaving comfort by reducing skin tug, or improving the user's perception of glide across their skin.

Examples of useful monomers for friction reduction are fluorinated monomers. These produce polymers with hydrocarbon back bones and fluorinated side groups, which similarly to PTFE may offer low coefficients of friction. However, as compared to PTFE coatings, the resulting polymers of the present invention are covalently anchored to the substrate surface.

Examples of friction reducing monomers include fluorinated polymers, such as pentafluorostyrene (PFS), pentafluoropropyl acrylate (PFA), trifluoroethyl acrylate (TFA), heptadecafluorodecyl acrylate (HFA), pentafluoropropyl methacrylate (PFA), trifluoroethyl methacrylate (TFA), heptadecafluorodecyl methacrylate (HFA), and mixtures thereof. The friction reducing monomers may be used in combination with other monomers, including those other monomers listed in this document.

In a preferred example, the polymer brush is a copolymer comprising a hydrophobic block adjacent to the substrate surface, and a hydrophilic block outer to the hydrophobic block. That is, in a preferred example, the copolymer comprises a proximal hydrophobic block and a distal hydrophilic block.

In such an example, the presence of a hydrophobic block adjacent the substrate may act as water barrier when the substrate is used in an aqueous environment, urging water away from the surface and reducing possible corrosion of the stainless-steel substrate.

The hydrophilic polymer brush block may act for aqueous lubrication along a user's skin during wet shaving.

In an example, the proximal hydrophobic block comprises fluorinated monomers.

In an example, the distal hydrophilic block comprises monomers having alkoxy groups.

In a preferred example, the polymer brush comprises a proximal hydrophobic block comprising fluorinated (meth)acrylate monomers, and a distal hydrophilic block comprising alkoxy (meth)acrylate monomers.

Preferred diblock copolymer brush structures include block copolymers of PFA with MEO$_2$MA and HFA with MEO$_2$MA.

Anti-Fouling Properties

A further example of surface modification can include the provision of anti-fouling properties that can combat microbe habituation of the modified surfaces, for example, a blade surface. This may be useful in reducing irritation and possibly infection in the event of skin breach during shaving.

Anti-fouling may be achieved by provision of protein anti-adhesive polymer brushes that aid in preventing adhesion of microbes and/or detritus (that might form nourishment for microbes) to a surface. Alternatively, anti-bacterial brushes may be provided that are imparted with microbe damaging or destructive properties.

In terms of anti-adhesive polymer brushes, hydrophilic chains may generally resist adherence of biomolecules as there can be a tendency for these to bind more preferably with hydrophobic surfaces. Exemplary polymers having good anti-adhesion toward proteins when formed into brushes include poly(methyl methacrylate) (PMMA) and poly(ethylene glycol) (PEG).

In terms of anti-bacterial properties, exemplary polymer brushes offering anti-bacterial properties include tBAEMA, and PDMAEMA.

In a further embodiment, the polymer brushes may comprise copolymers with both anti-adhesion and anti-bacterial monomers, to give the benefits of both resistance to protein adherence and anti-bacterial activity.

Anti-Corrosion Properties

A further example of surface modification can include the provision of anti-corrosion properties. For example, the use of hydrophobic polymer brushes applied to stainless steel may aid in reducing corrosion of the stainless-steel substrate by urging water away from the surface. For example, inclusion of non-polar monomers within the polymer brushes can aid in obstructing contact with polar liquids that may contribute to corrosion of the surface.

P(HFA) may provide a better barrier between an underlying metal substrate and ions in solution.

Stimuli Responsive Properties

A further example of surface modification can include the provision of stimuli responsive surfaces. For example, polymer brushes may be constructed to offer stimuli alterable characteristics. Exemplary stimuli may include temperature, pH, electric potential and/or immersion in a polar or non-polar solvent system. Such stimuli responsive changes are typically reversible.

An example of stimuli response includes thermoresponsive brushes. These are polymer brushes that have temperature dependent conformations in the range of use. For example, a shaving article my typically be stored at room temperature (25° C.) or below, while the shaving article may be raised to temperatures above room temperature during shaving use. A thermoresponsive polymer brush may shift from a cold conformation to a hot conformation to give different characteristics in the different temperature ranges. For example, a polymer brush may transition to a hot conformation at temperatures above 25° C., preferably at temperatures at or above 30° C., more preferably at temperatures at or above 35° C.

Examples of thermoresonsive polymers that can be included in the polymer brushes include Poly(N-isopropylacrylamide) (PNIPAM). PNIPAM is a temperature responsive polymer. Below 32° C. it is in an extended conformation taking on a brush form, which presents a hydrophilic surface. At temperatures above 32° C. it collapses to a globular form (its lower critical solution temperature (LCST)), and presents a more hydrophobic surface. This is believed to be due to the chains preferring hydrogen bonding with external water molecules below this temperature, with a preference for the side groups to form intramolecular hydrogen bonds above it.

Another example of stimuli responsive polymer brushes includes multi-block stimuli responsive polymer brushes. Multi-block co-polymers comprise two or more layers of polymer brush chains, with each individual chain of each layer being tethered at one end to the previous layer. By use of monomer blocks having dissimilar properties, the polymer brushes can be manipulated to behave differently under varying conditions. For example, monomer blocks can be solvent responsive.

An example of a diblock copolymer involves the use of a semi fluorinated monomer distal block and a hydrocarbon monomer proximal block. Application of various fluorinated and organic solvents can then be used to induce rearrangement between ultrahydrophobic when the fluoropolymers are extended to much less hydrophobic when collapsed.

Brush Characterization

In addition to the monomer makeup of the polymer brushes, the characteristics of the polymer brushes may be influenced by the surface area density of the polymer brushes on the surface (grafting density), which is related to the interbrush spacing. Furthermore, the chain length/molecular weight of the polymer brushes may be a relevant factor.

Chain length, which contributes to brush thickness, can be controlled by the initial amount of monomer when the reaction is allowed to go to completion. Alternatively, a large excess of monomer can be added and the reaction time controlled by active reaction termination.

Useful properties are achieved, for example, when the brush length (also named height), L, and the inter-brush spacing, s, (distance between adjacent brushes) grafted on a surface are in optimized ranges.

The brush length is preferably at least 5 nm, more preferably at least 10 nm, and most preferably at least 20 nm. A minimum brush length can help to ensure that sufficient polymer functionality is provided, for example that a good amount of functional monomer is included with the polymer brushes to achieve the above-mentioned functionalities or characteristics, e.g. hydrophilic, hydrophobic etc.

The brush length is preferably at most 200 nm, more preferably at most 150 nm, more still more preferably 100 nm and most preferably at most 50 nm. A maximum brush length may be associated with efficient application of polymer brushes, and maintenance of the polymer coated article's geometry, especially where the article is a razor blade and which may have an ultimate tip radius in the region of 10 to 300 nm.

The thickness of the brush layer is preferably from 5 to 200 nm, more preferably from 20 to 100 nm. The layer thickness can be determined using Scanning Electron Microscopy (SEM) or Transmission electron microscopy (TEM) to examine the cross-section of a coated substrate as compared to an uncoated substrate.

The inter-brush spacing is preferably relatively low, such that polymer chains are crowded and force one another into extended conformations. In particular, the preferred grafting density of the polymer chains is related to the length of the polymer chains that are grafted from the surface. To achieve preferred stabilities for a polymer brush conformation, the spacing between the chains is less than twice the polymer radius of gyration (rg).

The average inter-brush spacing is preferably at least 1 nm, more preferably at least 2 nm, more preferably at least 3 nm. The average inter-brush spacing is preferably at most 7 nm, more preferably at most 6 nm, more preferably at most 5 nm. The average inter-brush spacing is more preferably from 1 to 7 nm, more preferably from 2 to 6 nm and more preferably from 3 to 5 nm. The inter-brush spacing can be determined from the average density of initiation moieties at the surface (e.g. halides), and can be measured using X-ray photoelectron spectroscopy.

The inter-brush spacing may also be described in the inverse by the grafting density, i.e. the number of polymer brushes $nm^{-2}$. A lower inter-brush spacing gives a higher grafting density. The grafting density is preferably at least 1 brush per 10 $nm^2$, preferably at least 1 brush per 4 $nm^2$; or $10^{11}$ brushes $mm^2$. More preferably the grafting density is in the range from 0.05 to 2 chains per $nm^{-2}$, more preferably in the range from 0.05 to 1 chains per $nm^{-2}$.

In a preferred embodiment, the substrate is a sharpened blade and the polymer is lubricious. This may advantageously provide for a reduced coefficient of friction at the external surface of the blade.

Combined with Shaving Aid

In a further aspect of the invention, the shaving article may be adapted for combination with a personal care composition.

In this aspect, the polymer brushes may be provided with charged monomers having charged side groups, preferably being polyelectrolyte brushes. When provided in combination with a personal care composition comprising counter ions, a particularly good friction mediation may be achieved. This is believed to be due to the counter ions supporting some of the load when the surfaces are pushed together and also hindering interdigitation due to the ionic repulsions.

In line with this, an aspect of the present invention there may be provided a kit of parts comprising:
 a shaving article comprising a substrate and an outer polymer coating, the substrate comprising stainless steel; and the outer polymer coating comprising polymer brushes covalently bonded to the substrate, wherein said polymer brushes comprise charged groups; and
 a dermatologically acceptable (topically applicable) shaving composition comprising counter ions to the charged groups of the polymer brushes.

This aspect of the invention may also comprise a method of shaving comprising:
 i) providing a razor blade comprising a substrate and an outer polymer coating, the substrate comprising stainless steel; and the outer polymer coating comprising polymer brushes covalently bonded to the substrate, wherein said polymer brushes comprise charged groups; and
 ii) applying a dermatologically acceptable (topically applicable) shaving composition comprising counter ions to the charged groups of the polymer brushes to an area of skin; and
 iii) shaving said skin area with the razor blade.

The charged side groups may comprise anionic groups such as carboxylic acid groups, sulphonic acid groups or phosphoric acid groups and/or cationic groups such as amine groups, pyridinium groups, sulfonium groups and cationic tertiary amine groups.

The dermatologically acceptable shaving composition is any of a shaving solution, emulsion (water in oil or oil in water emulsion etc.), gel, foam, or similar. The shaving composition may comprise detersive surfactants, water, pH modifier, humectants, personal care benefit agents, propellant, and commonly used ingredients.

In one embodiment, the polymer brushes are zwitterionic, and preferably comprise zwitterionic side groups. In such an embodiment friction mediation can be achieved with just water because counterions may not be needed, as may be the case with anionic or cationic brush polymers, in order to aid the friction mediation. The water layer between the brushes and the skin and/or hair aids lubrication.

BRIEF DESCRIPTION OF THE DRAWINGS

The features and advantages of the invention will be appreciated upon reference to the following drawings, in which.

DETAILED DESCRIPTION OF THE INVENTION

The following is a description of aspects and features of the invention, given by way of example only and with reference to the drawings.

EXAMPLES

The following examples demonstrate, by way of illustration only, polymer brush systems grafted from stainless steel substrates.

Stainless steel substrates were stainless steel sheet (thickness 5 mm, Fe/Cr-13, AEB-L grade) laser cut into 10×10 mm squares.

In examples 1, 2 and 3 below, polymer brushes incorporating monomers of pentafluoropropyl acrylate (PFA), heptadecafluorodecyl acrylate (HFA), and 2-(2-methoxyethoxy) ethyl methacrylate ($MEO_2MA$) are demonstrated.

In examples 4 and 5, addition of bi-layer copolymer brushes is demonstrated by grafting of 2-(2-methoxyethoxy) ethyl methacrylate ($MEO_2MA$) from the products of examples 1 and 2.

Substrate Preparation

Four 10×10×5 mm blocks of stainless steel were polished and cleaned. They were then exposed for 25 minutes in a UV-Ozone cleaner to remove the hydrocarbon contaminants and increase the surface hydroxy group concentration, with which the initiator species can subsequently react.

Thereafter the stainless-steel samples were functionalised with BTPAm initiator as follows. 3 parts by volume of initiator was added to 10 parts by volume methanol and was dispersed by stirring for 2 min, followed by the addition of 87 parts by volume deionized water. The mixture was stirred at 40° C. until the cloudy solution turned transparent (about one hour). The transparent solution was then cooled to room temperature.

The well-cleaned stainless-steel substrates were then immersed into the initiator solution at ambient temperature for 30 min to immobilise the initiator. The stainless-steel substrates were taken out from the initiator solution and dried under a pressurised stream of $N_2$, followed by 60 min of curing at 60° C. in an oven. After curing, the samples were rinsed with methanol and water, being dried with $N_2$.

Example 1—P(HFA) Brush Synthesis

A 50 ml flask was charged with a stir bar and the monomer heptadecafluorodecyl acrylate (HFA) (6 ml, 9.82 g, 19.0 mmol) was measured into the flask. To this 18 ml of DMF was added along with a TDA ligand (0.301 ml, 304.5 mg, 0.94 mmol). Once this had fully dispersed after a minute or so of stirring $FeBr_3$ (11.9 mg, 0.04 mmol), the deactivator, was inserted. The flask was sealed, stirred at 110° C., and purged with nitrogen for 30 minutes. After the 30 minutes $FeBr_2$ (65.7 mg, 0.305 mmol) was added to the flask and then it was resealed and left to purge for a further 30 minutes.

During degassing of the reagents, the BTPAm-functionalized substrates were placed into test tubes ensuring that the polished and functionalized side faced upwards. These tubes were sealed and placed in a reaction station. Several evacuation and nitrogen refilling cycles were performed finally leaving the tubes under nitrogen, ensuring all tubes contained an inert atmosphere.

Once degassed the heated reagent mixture solution was withdrawn into a nitrogen purged syringe and 2 ml was carefully injected into each the tubes containing the initiated substrate and heat at 110° C. was applied.

Following polymerization, the lid was opened from the tube and the solution was carefully poured away to stop the reaction and the sample was removed ensuring minimal contact with the upwards facing grafted surface.

Each sample was rinsed copiously and with hot $\alpha\alpha\alpha$-trifluorotoluene and sonicated in the same before being blown dry under a $N_2$ flow.

In this manner, a semi-fluorinated layer was successfully added to the substrate to mimic a PTFE coating and to form a corrosion resistant layer acting to drive water away from the metal surface.

Example 2—P(PFA) Brush Synthesis

The synthesis reaction was carried out as with example 1 P(HFA) except with altered volumes for the monomer and solvent respectively as follows; pentafluoropropyl acrylate (PFA) (2.91 ml, 3.84 g, 19.0 mmol) and DMF (21.09 ml).

In this manner, a semi-fluorinated layer was successfully added to the substrate to mimic a PTFE coating and to form a corrosion resistant layer acting to drive water away from the metal surface.

Example 3—P(MEO$_2$MA) Brush Synthesis

The addition of a P(MEO$_2$MA) polymer chain was carried out using the same procedure for examples 1 and 2.

This was used as a hydrophilic, water-swellable layer believed to result in high load bearing characteristics leading to a reduction of friction.

Examples 4—P(PFA-b-MEO2MA) Block Copolymer Brush Synthesis

The addition of a second polymer block comprising P(MEO$_2$MA) was carried out using the same procedure for the single block synthesis of example 3 except the substrates were pre-grafted with P(PFA) as in example 1.

Example 5—P(HFA-b-MEO2MA) Block Copolymer Brush Synthesis

The addition of a second polymer block comprising P(MEO$_2$MA) was carried out using the same procedure for the single block synthesis of example 3 except the substrates were pre-grafted with P(HFA) as in example 2.

Comparative Example

In order to compare the grafted fluorinated layers on SS to an industry standard PTFE coating, stainless steel substrates were prepared using the same pre-functionalisation procedure were coated with PTFE. Polished stainless-steel blocks were sprayed with an aqueous dispersion of PTFE. This was subject to ionising radiation in the presence of oxygen to remove excess PTFE. The layer was then sintered between 305° C. and 470° C.

Contact angle measurements of the modified substrates were taken using the Sessile drop method. The contact angle measurements indicated successful modification of the surface, as shown in table 1.

TABLE 1

| Example | Sample | Contact angle (°) |
|---|---|---|
| / | SS-(UVO) | 15.0 |
| / | SS-BTPAm | 59.2 |
| 1 | SS-P(PFA) | 98.3 |
| 2 | SS-P(HFA) | 119.2 |
| 3 | SS-P(MEO$_2$MA) | 52.6 |
| 4 | SS-P(PFA-b-MEO$_2$MA) | 23.0 |
| 5 | SS-P(HFA-b-MEO$_2$MA) | 46.9 |
| Comparative | SS-PTFE[a] | 118.3 |

SS = Stainless Steel

It is clear that attachment P(PFA) and P(HFA) to the surface had occurred due to the highly hydrophobic values measured at 98.3° and 119.2° respectively. Decreased contact angles of 23.0° for the P(PFA-b-MEO$_2$MA) and 46.9° for the P(PFA-b-MEO$_2$MA) indicate a hydrophilic exterior. Example 3 with a single block of P(MEO$_2$MA) on the initiated stainless steel gave a contact angle of 52.6° and so was also hydrophilic. The PTFE coated sample exhibited a contact angle of 118.3°, indicating that P(HFA)(119.2°) was able to display a similar degree of hydrophobicity to PTFE.

Application to Blades

Using the same techniques as discussed in examples 1 to 5 above, polymer brushes were grafted from stainless steel razor blade substrates. Razor blades with the following polymer brushes were tested: block copolymer TFA and PMO; PFA and PMO; PFS and PMO; HFA-PMO; PMO; PFS; PFA; TFA; and HFA.

Figure 1:
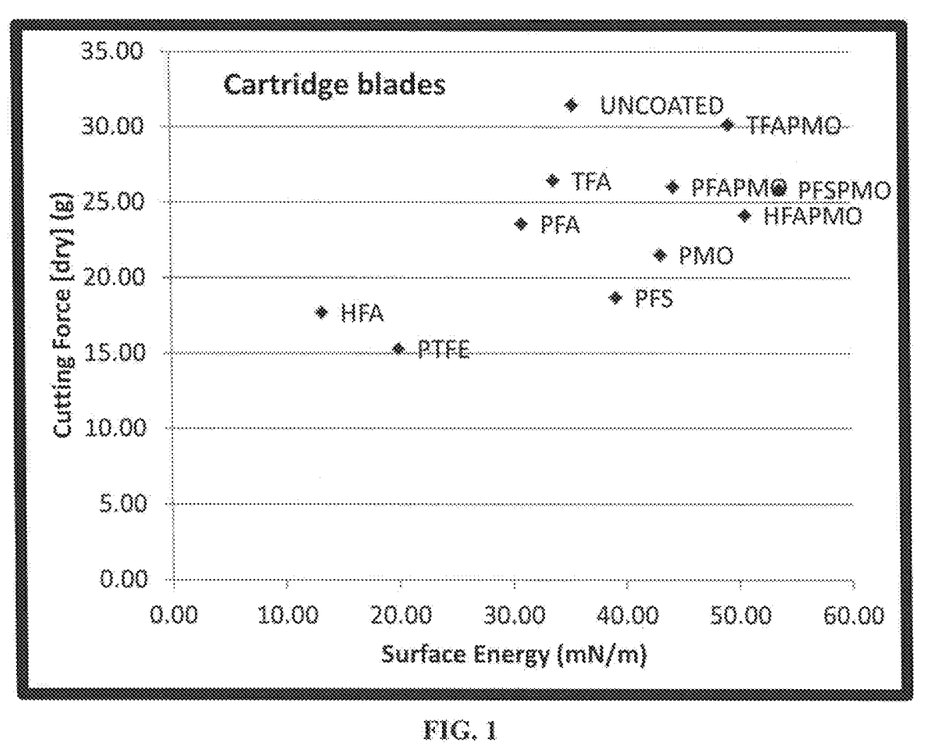
FIG. 1 is a graphic of cutting force associated with a variety of coated razor blades.

FIG. 1 shows the cutting force results for the treated razor as compared to the uncoated stainless-steel substrate and an industry standard applied PTFE. As can be seen from the figure, all treated blades showed a reduced cutting force as compared to the uncoated stainless steel, with polymer brushes of HFA performing comparably well with the standard PTFE.

The cutter force can be measured by a method including the steps of providing a blade having an edge; providing a fiber mount for holding the fiber; providing a sensor connected to the fiber mount; moving the blade toward the fiber and cutting the fiber; and measuring the cutting force on the fiber with the sensor. Such a test is described in patent publication US 2011/0214493, the content of which is hereby incorporated by reference.

Figure 2:
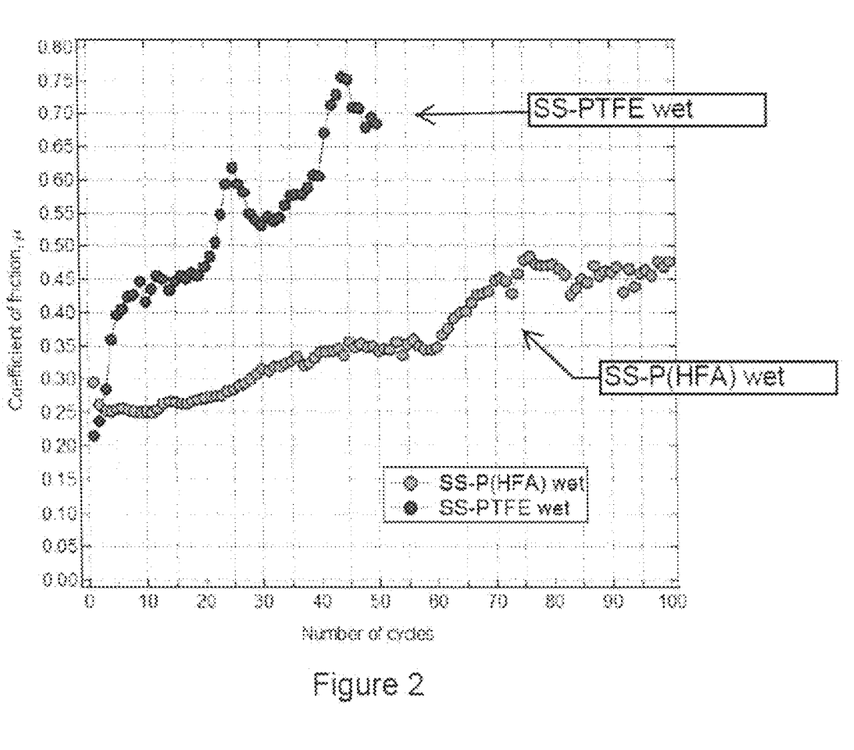
FIG. 2 is a graphic of coefficient of friction development for steel blades during cutting cycles.

FIG. 2 shows the results of sustained friction tests for stainless steel substrates coated with conventional PTFE coating and stainless-steel substrates coated with polymer brushes of P(HFA), while wet and at room temperature, and using Microtribometry. In the tests 50 loading and unloading cycles were inflicted upon the substrates.

As can be seen from FIG. 2, the coefficient of friction of the conventional PTFE coated substrate quickly increases suggesting loss or damage to the lubricating PTFE coating with each testing cycle. This is in contrast to the SS-P(HFA) substrate, which maintains a low coefficient of friction for a greater number of testing cycles.

As discussed previously, the present invention is applicable to shaving articles. Preferred shaving articles may be cutting elements, in particular razor blades of wet shave razors or cutter elements of electric dry razors. Other preferred shaving articles may be non-cutting elements, in particular blade clips in a wet shaver or outer or inner surfaces of a foil disposed in an electric dry shaver.

Figure 3:
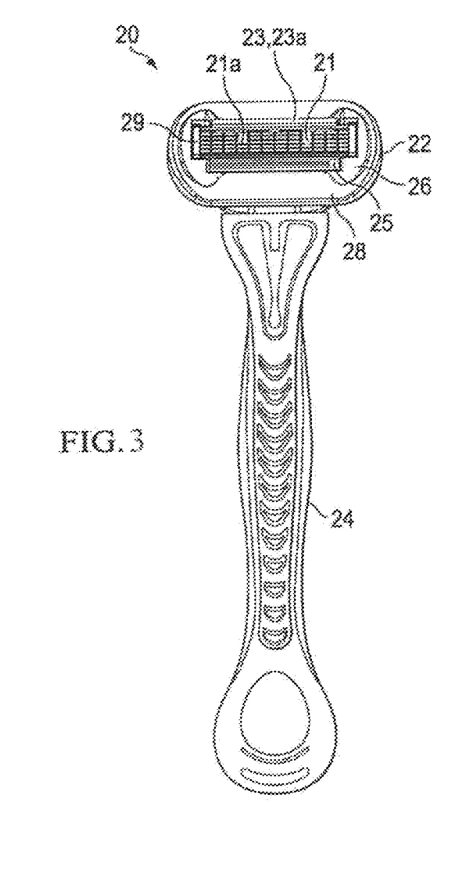
FIG. 3 is a front schematic view of a wet razor having a cartridge unit and a handle.

Referring to FIG. 3, a front view of a wet razor 20 generally includes a shaving or cartridge unit 22 attached to a handle 24 with the shaving unit 22 having one or more blades 21 (e.g., 5 blades shown) each with a sharpened edge 21a and comprising stainless steel. A cap 23 and guard 25 may also be included in the shaving unit 22, the cap 23 preferably including a lubricating strip or shaving aid composite 23a affixed thereon. The shaving unit 22 also includes a frame or housing 26, preferably made of hard plastic. In this particular shaving unit 22, there is also present a lubricating ring 28 disposed around the periphery of the shaving unit 22. The lubricating ring 28 may generally be comprised of water soluble and water insoluble polymers. The cartridge unit 22 may be adapted for coupling and uncoupling from the razor handle 24 such that a new cartridge unit 22 may be coupled to the handle when the blades become dull or may be integral with a handle 24 so that the complete razor 10 is discarded when the blades become dull.

Figure 3A:
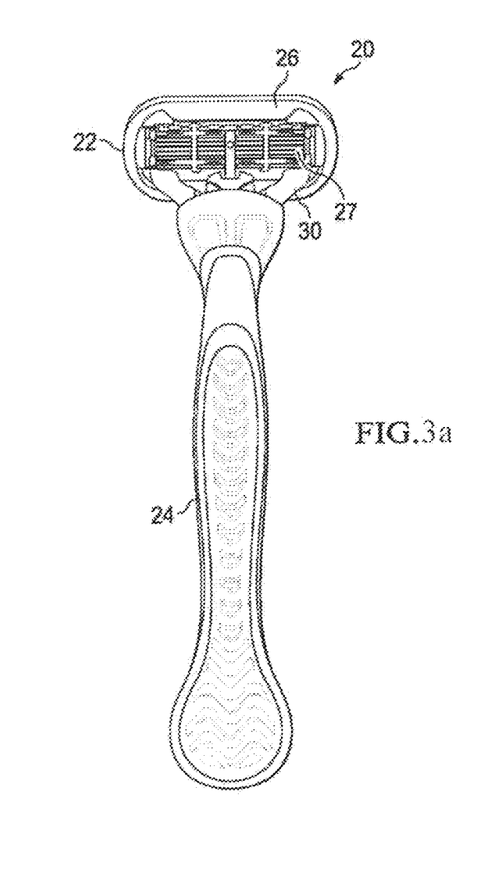
FIG. 3a is a rear schematic view of the wet razor of claim 1.

FIG. 3a depicts the opposite or rear side of the razor 20 showing the back side of the frame 26 along with a blade support unit 27 which preferably may be a metal or plastic unit used to support the individual blades. The blade support 27 may preferably be disposed within an aperture of the frame 26 after the blades 21 are inserted therein and held in by a pair of blade clips 29 on either end of the support 27. Also shown in FIG. 2a is a cartridge connecting structure 30 which is a structure that connects the cartridge unit 22 to the handle 24. The structure 30 may be part of the handle 24 or may be part of the cartridge unit 22.

While a specific embodiment of a razor is depicted in FIGS. 3 and 3a, any razor construction type is contemplated in the present invention.

In accordance with the invention, the razor blade edges 21a, razor blades 21, blade clips 29, and/or blade support 27 comprise stainless steel substrates, and a coating of polymer brushes grafted from one or more portions of the surfaces of those shaving articles, in accordance with the invention.

Figure 4:
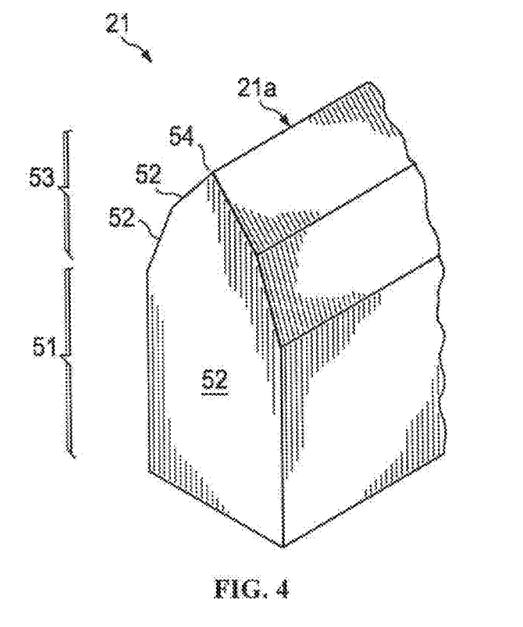
FIG. 4 is a close-up schematic view of elements of a blade edge of the present invention.

Referring to FIG. 4, there is a razor blade edge 21a. The razor blade edge 21a includes a blade body 51, two bevels 56 for each of two flanks 53 which intersect at tip 54 forming the blade edge 21a.

A diagrammatic view of a blade region 60 or sharpened substrate, and in particular the blade body region 51 and blade edge 21a of blade edge 21 of FIG. 3, is shown in FIG. 4.

Figure 5:
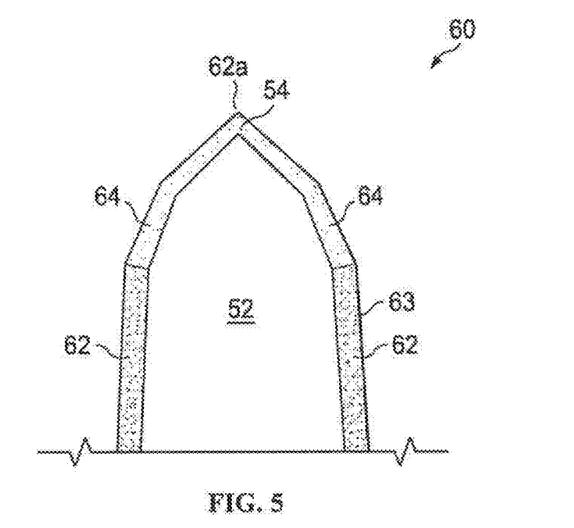
FIG. 5 is a close-up schematic view of the blade of FIG. 3 having polymer brush layer grafted thereon.

Grafted from the body 51 and flanks 53 of substrate 52 is a polymer brush layer 62, 64. In FIG. 5 the polymer brush layer 62, 64 may be deposited directly onto the substrate as shown or may be deposited on top of one or more other layers already deposited on the substrate 22, such as one or more interlayers, one or more adhesion layers and/or one or more overcoat layers (not shown). For example, the stainless steel based or core of the substrate may be coated with layers of inorganic materials for hardness and corrosion resistance, such as diamond, amorphous diamond, diamond-like carbon (DLC) material, nitrides, carbides, oxides, and ceramics in general, which may form part or all of an intermediate layer, upon which the polymer brush layer is provided.

The present invention further contemplates that the polymer brushes in addition to, or alternatively to, being bound to razor blade surfaces are also provided on any other razor components, such as on the blade clips 29. The clips 29 are generally made of a metal. The metal may be comprised of stainless steel, but may also be aluminum. The shaving benefits of glide, comfort, cleanliness etc. along the shave path may be augmented by adding the polymer brushes (e.g., a lubricious polymer brushes or antibacterial brushes) on the upper surface of the clips 29 which are generally disposed on the left and right sides of the cartridge.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of making a shaving article comprising:
   a substrate comprising stainless steel; and
   a polymer coating comprising polymer brushes, the method comprising the steps of:
   a. providing said substrate;
   b. providing an initiating species comprising an anchor group that is chemically reactive with surface moieties on the substrate, and a polymerization initiator group, the polymerization initiator group is an alkyl halide;
   c. reacting said anchor group with said surface moieties of the substrate;
   d. providing monomers reactive for polymerization with the polymerization initiator; and e. polymerizing the monomers with the initiator group of the initiating species.

2. The method of claim 1 wherein the substrate in step a. comprises hydroxy groups or oxo groups.

3. The method of claim 2 including the step of treating the substrate to increase the surface density of hydroxy groups and/or oxo groups prior to step c.

4. The method of claim 1, wherein the anchor group is selected from the group consisting of acrylate groups, hydroxy groups, silane groups, and phosphonic acid groups.

5. The method of claim 4, wherein the silane group is selected from the group consisting of alkoxylsilane groups and halide silane groups.

6. The method of claim 1, wherein the anchor group is an alkoxysilane group having the formula $Si(OR)_3$, where R is a lower alkyl group.

7. The method of claim 1, wherein the halide is selected from the group consisting of Br and Cl.

8. The method of claim 1, wherein the initiating species comprises 2-bromo-2-methyl-N-(3-(triethoxysilyl)propyl) propanamide.

9. The method of claim 1, wherein polymerization step e. involves atom transfer radical polymerization.

10. The method of claim 1, wherein in steps d. and e. a block copolymer is generated, said block copolymer preferably having a proximal hydrophobic block and a distal hydrophilic block.

* * * * *